(12) United States Patent
Hollingsworth

(10) Patent No.: US 12,399,051 B2
(45) Date of Patent: Aug. 26, 2025

(54) SELECTING A MEASUREMENT CORRECTION METHOD

(71) Applicant: MICRO MOTION, INC., Boulder, CO (US)

(72) Inventor: Justin Craig Hollingsworth, Fort Collins, CO (US)

(73) Assignee: MICRO MOTION, INC., Boulder, CO (US)

( * ) Notice: Subject to any disclaimer, the term of this patent is extended or adjusted under 35 U.S.C. 154(b) by 0 days.

(21) Appl. No.: 17/802,027

(22) PCT Filed: Mar. 5, 2020

(86) PCT No.: PCT/US2020/021110
§ 371 (c)(1),
(2) Date: Aug. 24, 2022

(87) PCT Pub. No.: WO2021/177961
PCT Pub. Date: Sep. 10, 2021

(65) Prior Publication Data
US 2025/0003782 A1    Jan. 2, 2025

(51) Int. Cl.
*G01F 15/02*    (2006.01)
*G01F 1/74*    (2006.01)
*G01F 1/80*    (2006.01)
*G01F 1/84*    (2006.01)

(52) U.S. Cl.
CPC .............. *G01F 15/022* (2013.01); *G01F 1/74* (2013.01); *G01F 1/80* (2013.01); *G01F 1/8431* (2013.01); *G01F 1/8436* (2013.01)

(58) Field of Classification Search
CPC .... G01F 15/022; G01F 1/8436; G01F 1/8431; G01F 1/74; G01F 1/80
See application file for complete search history.

(56) References Cited

U.S. PATENT DOCUMENTS

| | | |
|---|---|---|
| 2005/0022611 A1 | 2/2005 | Hemp et al. |
| 2005/0193832 A1 | 9/2005 | Tombs et al. |
| 2008/0300802 A1 | 12/2008 | Lakhani et al. |
| 2016/0290841 A1 | 10/2016 | Cadalen et al. |
| 2018/0003538 A1 | 1/2018 | Schollenberger et al. |
| 2019/0170552 A1 | 6/2019 | Dutton |
| 2020/0033174 A1* | 1/2020 | Nogueira ............... G01N 27/10 |

FOREIGN PATENT DOCUMENTS

WO    2019199268 A1    10/2019

* cited by examiner

*Primary Examiner* — Paul M. West
(74) *Attorney, Agent, or Firm* — The Ollila Law Group LLC

(57) ABSTRACT

A meter electronics (20) for selecting a measurement correction method is provided. The meter electronics (20) comprises an interface (501) configured to communicatively couple to a sensor assembly (10) and receive sensor signals from the sensor assembly (10) and a processing system (502) communicatively coupled to the interface (501). The processing system (502) is configured to store two or more measurement correction methods, wherein the two or more measurement correction methods compensate for multi-phase effects of a multiphase fluid in the sensor assembly, determine one or more process parameter values, and select one of the two or more measurement correction methods based on the one or more process parameter values.

16 Claims, 6 Drawing Sheets

SELECTING A MEASUREMENT CORRECTION METHOD

TECHNICAL FIELD

The embodiments described below relate to fluid property measurements and, more particularly, to selecting a measurement correction method.

BACKGROUND

Vibratory meters, such as for example, Coriolis mass flowmeters, liquid density meters, gas density meters, liquid viscosity meters, gas/liquid specific gravity meters, gas/liquid relative density meters, and gas molecular weight meters, are generally known and are used for measuring characteristics of fluids. Generally, vibratory meters comprise a sensor assembly and a meter electronics. The material within the sensor assembly may be flowing or stationary. The vibratory meter may be used to measure a mass flow rate, density, or other properties of a material in the sensor assembly.

Material flows into the vibratory meter from a connected pipeline on the inlet side of the vibratory meter, is directed through the measuring conduit(s), and exits the vibratory meter through the outlet side of the vibratory meter. The natural vibration modes of the vibrating system are defined in part by the combined mass of the measuring conduits and the material flowing within the measuring conduits.

When there is no-flow through the vibratory meter, a driving force applied to the measuring conduit(s) causes all points along the measuring conduit(s) to oscillate with identical phase or a small "zero offset", which is a time delay measured at zero flow. As material begins to flow through the vibratory meter, Coriolis forces cause each point along the measuring conduit(s) to have a different phase. For example, the phase at the inlet end of the vibratory meter lags the phase at the centralized driver position, while the phase at the outlet leads the phase at the centralized driver position. Pickoffs on the measuring conduit(s) produce sinusoidal signals representative of the motion of the measuring conduit(s). Signals output from the pickoffs are processed to determine the time delay between the pickoffs. The time delay between the two or more pickoffs is proportional to the mass flow rate of material flowing through the measuring conduit(s). Meter electronics connected to the driver generate a drive signal to operate the driver and determine a mass flow rate and other properties of a material from signals received from the pickoffs.

When a multiphase flow is present, a mass flow rate determined from the time delay may not be correct. That is, an uncorrected mass flow rate value may not be an accurate measurement of an actual mass flow rate through the vibratory meter. Accordingly, a measurement correction method may be used to determine a corrected mass flow rate value from the uncorrected mass flow rate value. If the measurement correction method is appropriate for the multiphase fluid, then the corrected mass flow value may be an accurate measurement of the actual mass flow rate through the vibratory meter. However, the measurement correction method may not be appropriate for the multi-phase flow. As a result, the corrected mass flow rate value may not be an accurate measurement of the actual mass flow rate through the vibratory meter. There is a need therefore for selecting a measurement correction method.

SUMMARY

A meter electronics for selecting a measurement correction method is provided. According to an embodiment, the meter electronics comprises an interface configured to communicatively couple to a sensor assembly and receive sensor signals from the sensor assembly and a processing system communicatively coupled to the interface. The processing system is configured to store two or more measurement correction methods. The two or more measurement correction methods compensate for multiphase effects of a multiphase fluid in the sensor assembly, determine one or more process parameter values, and select one of the two or more measurement correction methods based on the one or more process parameter values.

A method for selecting measurement correction method is provided. According to an embodiment, the method comprises storing two or more measurement correction methods. The two or more measurement correction methods compensate for multiphase effects of a multiphase fluid in the sensor assembly. The method further comprises determining one or more process parameter values, and selecting one of the two or more measurement correction methods based on the one or more process parameter values.

Aspects

According to an aspect, a meter electronics (20) for selecting measurement correction method comprises an interface (501) configured to communicatively couple to a sensor assembly (10) and receive sensor signals from the sensor assembly (10) and a processing system (502) communicatively coupled to the interface (501). The processing system (502) is configured to: store two or more measurement correction methods, wherein the two or more measurement correction methods compensate for multiphase effects of a multiphase fluid in the sensor assembly, determine one or more process parameter values, and select one of the two or more measurement correction methods based on the one or more process parameter values.

Preferably, the processing system (502) is further configured to determine a fluid property value based on the sensor signals and use the selected one of the two or more measurement correction methods to correct the fluid property value.

Preferably, the processing system (502) being configured to select one of the two or more measurement correction methods based on the one or more process parameter values comprises the processing system (502) being configured to select the one of the two or more measurement correction methods based on a comparison of the one or more process parameter values to corresponding reference values.

Preferably, the processing system (502) being configured to select the one of the two or more measurement correction methods based on a comparison of the one or more process parameter values to corresponding reference values comprises the processing system (502) being configured to select the one of the two or more measurement correction methods based on a combination of at least two of the comparisons.

Preferably, the processing system (502) is further configured to detect and identify a single-phase fluid flow based on the one or more process parameter values and determine a hold value type of the single-phase fluid flow based on the identification of the single-phase fluid flow.

Preferably, the processing system (502) being configured to select the one of the two or more measurement correction methods based on the fluid property comprises the processing system (502) being configured to compare a hold value age to a hold value time of the fluid property, and select the one of the two or more measurement correction methods based on the comparison.

Preferably, the processing system (502) is further configured to simultaneously perform at least two of the two or more measurement correction methods.

Preferably, the one or more process parameter values is at least one of a drive gain value, a density value, hold value type, hold value age, and a pulse present value.

According to an aspect, a method for selecting a measurement correction method comprises storing two or more measurement correction methods, wherein the two or more measurement correction methods compensate for multi-phase effects of a multiphase fluid in the sensor assembly, determining one or more process parameter values, and selecting one of the two or more measurement correction methods based on the one or more process parameter values.

Preferably, the method further comprises determining a fluid property value based on the sensor signals and using the selected one of the two or more measurement correction methods to correct the fluid property value.

Preferably, selecting the one of the two or more measurement correction methods based on the one or more process parameter values comprises selecting the one of the two or more measurement correction methods based on a comparison of the one or more process parameter values to corresponding reference values.

Preferably, selecting the one of the two or more measurement correction methods based on a comparison of the one or more process parameter values to corresponding reference values comprises selecting the one of the two or more measurement correction methods based on a combination of at least two of the comparisons.

Preferably, the method further comprises detecting and identifying a single-phase fluid flow based on the one or more process parameter values and determining a hold value type of the single-phase fluid flow based on the identification of the single-phase fluid flow.

Preferably, selecting the one of the two or more measurement correction methods based on the fluid property comprises comparing a hold value age to a hold value time of the fluid property, and selecting the one of the two or more measurement correction methods based on the comparison.

Preferably, the method further comprises simultaneously performing at least two of the two or more measurement correction methods.

Preferably, the one or more process parameter values is at least one of a drive gain value, a density value, hold value type, hold value age, and a pulse present value.

BRIEF DESCRIPTION OF THE DRAWINGS

The same reference number represents the same element on all drawings. It should be understood that the drawings are not necessarily to scale.

DETAILED DESCRIPTION

FIGS. 1-6 and the following description depict specific examples to teach those skilled in the art how to make and use the best mode of embodiments of selecting a measurement correction method. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of selecting a measurement correction method. As a result, the embodiments described below are not limited to the specific examples described below, but only by the claims and their equivalents.

Figure 1:
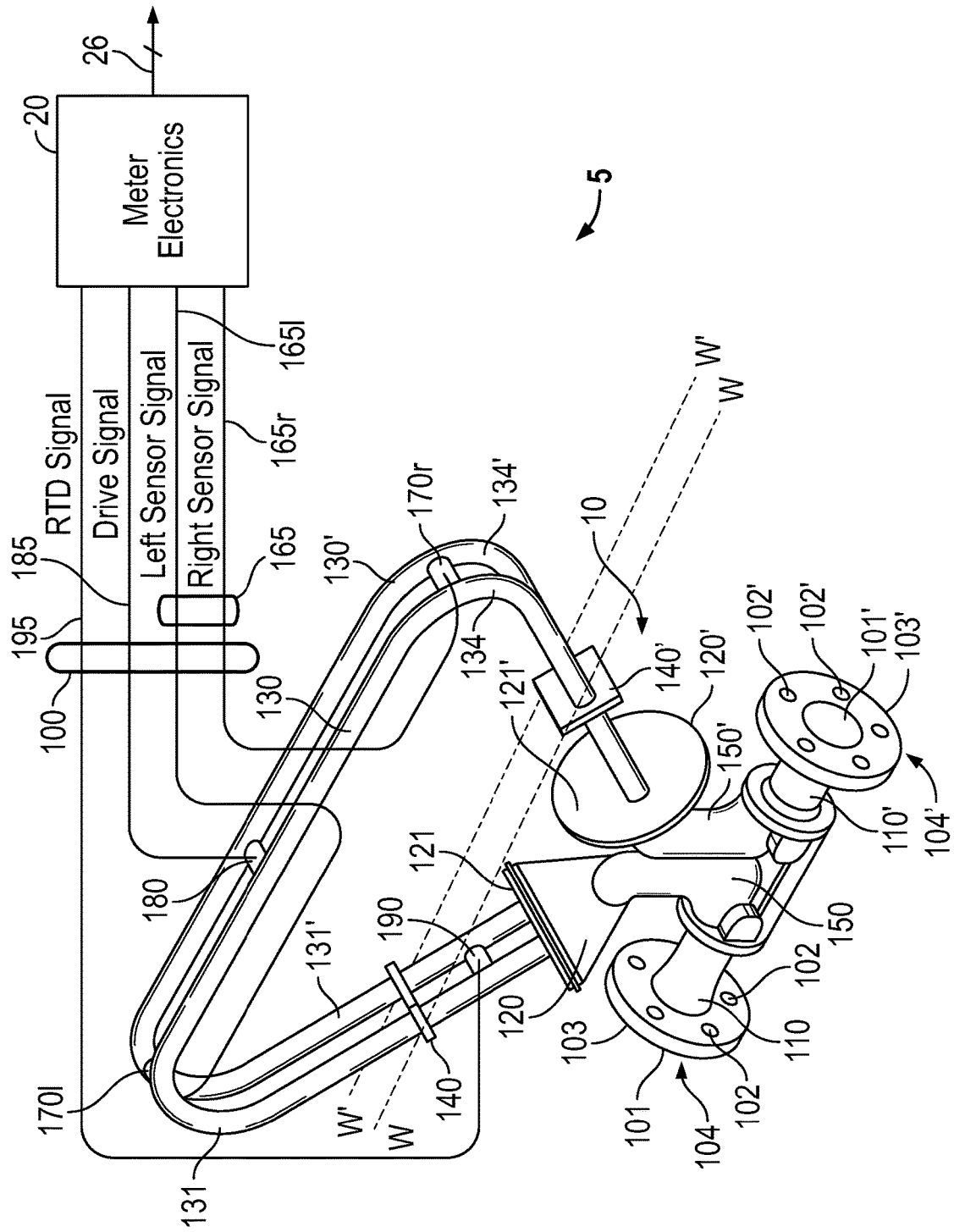
FIG. 1 shows a vibratory meter 5 for selecting a measurement correction method.

FIG. 1 shows a vibratory meter 5 for selecting a measurement correction method. As shown in FIG. 1, the vibratory meter 5 comprises a sensor assembly 10 and meter electronics 20. The sensor assembly 10 responds to mass flow rate and density of a process material. The meter electronics 20 is connected to the sensor assembly 10 via leads 100 to provide density, mass flow rate, and temperature information over port 26, as well as other information.

The sensor assembly 10 includes a pair of manifolds 150 and 150', flanges 103 and 103' having flange necks 110 and 110', a pair of parallel conduits 130 and 130', driver 180, resistive temperature detector (RTD) 190, and a pair of pick-off sensors 170l and 170r. Conduits 130 and 130' have two essentially straight inlet legs 131, 131' and outlet legs 134, 134', which converge towards each other at conduit mounting blocks 120 and 120'. The conduits 130, 130' bend at two symmetrical locations along their length and are essentially parallel throughout their length. Brace bars 140 and 140' serve to define the axis W and W' about which each conduit 130, 130' oscillates. The legs 131, 131' and 134, 134' of the conduits 130, 130' are fixedly attached to conduit mounting blocks 120 and 120' and these blocks, in turn, are fixedly attached to manifolds 150 and 150'. This provides a continuous closed material path through sensor assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the conduit mounting block 120 having a surface 121. Within the manifold 150 the material is divided and routed through the conduits 130, 130'. Upon exiting the conduits 130, 130', the process material is recombined in a single stream within the block 120' having a surface 121' and the manifold 150' and is thereafter routed to outlet end 104' connected by the flange 103' having holes 102' to the process line (not shown).

The conduits 130, 130' are selected and appropriately mounted to the conduit mounting blocks 120, 120' so as to have substantially the same mass distribution, moments of inertia and Young's modulus about bending axes W—W and W'—W', respectively. These bending axes go through the brace bars 140, 140'. Inasmuch as the Young's modulus of the conduits change with temperature, and this change affects the calculation of flow and density, RTD 190 is mounted to conduit 130' to continuously measure the temperature of the conduit 130'. The temperature of the conduit 130' and hence the voltage appearing across the RTD 190 for a given current passing therethrough is governed by the temperature of the material passing through the conduit 130'. The temperature dependent voltage appearing across the RTD 190 is used in a well-known method by the meter electronics 20 to compensate for the change in elastic modulus of the conduits 130, 130' due to any changes in conduit temperature. The RTD 190 is connected to the meter electronics 20 by lead 195.

Both of the conduits 130, 130' are driven by driver 180 in opposite directions about their respective bending axes W and W' and at what is termed the first out-of-phase bending mode of the flow meter. This driver 180 may comprise any one of many well-known arrangements, such as a magnet mounted to the conduit 130' and an opposing coil mounted to the conduit 130 and through which an alternating current is passed for vibrating both conduits 130, 130'. A suitable drive signal 185 is applied by the meter electronics 20, via a lead, to the driver 180.

The meter electronics 20 receives the RTD temperature signal on lead 195, and sensor signals 165 appearing on leads 100 carrying left and right sensor signals 165l, 165r, respectively. The meter electronics 20 produces the drive signal 185 appearing on the lead to driver 180 and vibrate conduits 130, 130'. The meter electronics 20 processes the left and right sensor signals 165l, 165r and the RTD signal 195 to compute the mass flow rate and the density of the material passing through sensor assembly 10. This information, along with other information, is applied by meter electronics 20 over path 26 as a signal. A more detailed discussion of the meter electronics 20 follows.

Figure 2:
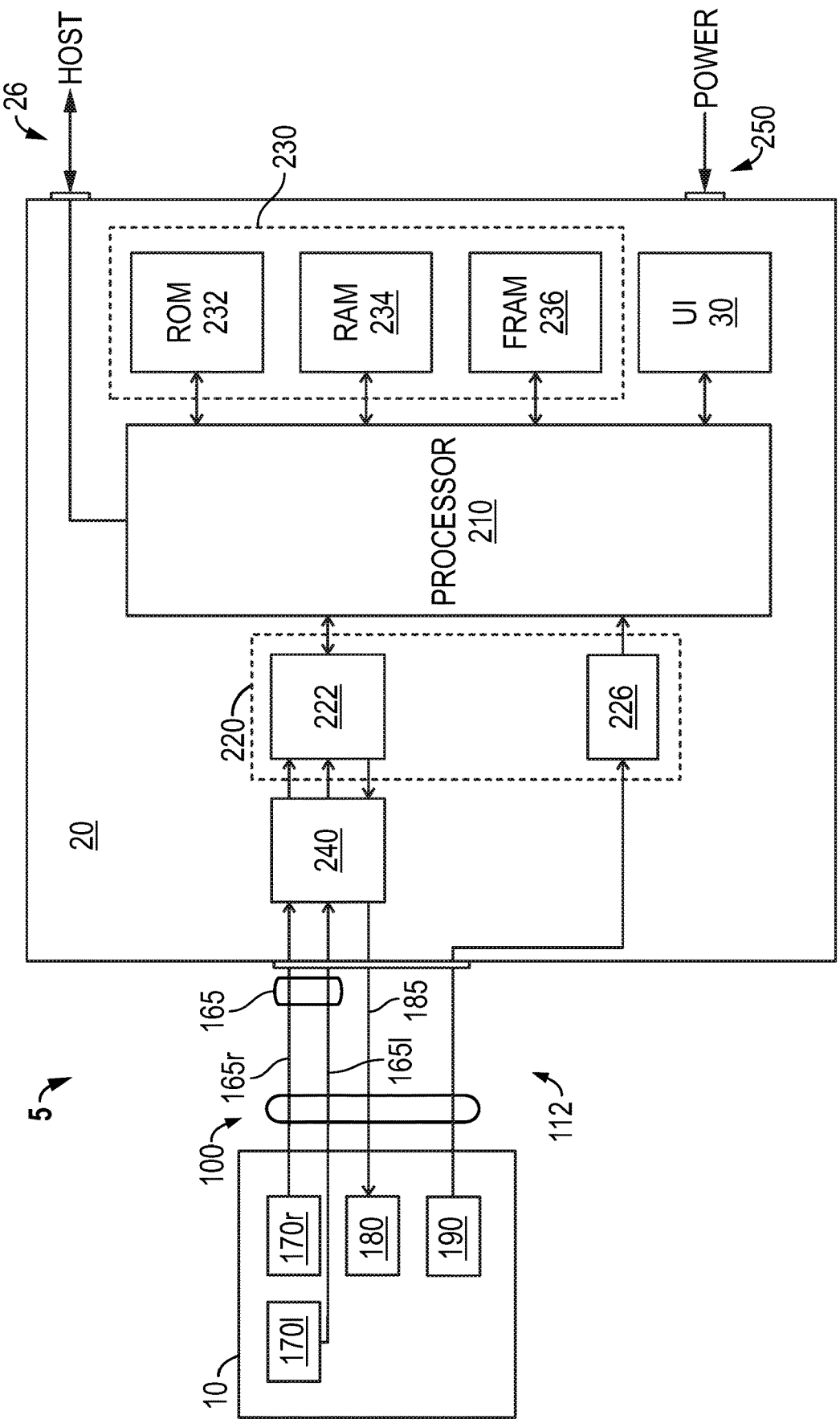
FIG. 2 shows a block diagram of the vibratory meter 5, including a block diagram representation of the meter electronics 20.

FIG. 2 shows a block diagram of the vibratory meter 5, including a block diagram representation of the meter electronics 20. As shown in FIG. 2, the meter electronics 20 is communicatively coupled to the sensor assembly 10. As described in the foregoing with reference to FIG. 1, the sensor assembly 10 includes the left and right pick-off sensors 170l, 170r, driver 180, and temperature sensor 190, which are communicatively coupled to the meter electronics 20 via the set of leads 100 through a communications channel 112.

The meter electronics 20 provides a drive signal 185 via the leads 100. More specifically, the meter electronics 20 provides a drive signal 185 to the driver 180 in the sensor assembly 10. In addition, sensor signals 165 comprising the left sensor signal 165l and the right sensor signal 165r are provided by the sensor assembly 10. More specifically, in the embodiment shown, the sensor signals 165 are provided by the left and right pick-off sensor 170l, 170r in the sensor assembly 10. As can be appreciated, the sensor signals 165 are respectively provided to the meter electronics 20 through the communications channel 112.

The meter electronics 20 includes a processor 210 communicatively coupled to one or more signal processors 220 and one or more memories 230. The processor 210 is also communicatively coupled to a user interface 30. The processor 210 is communicatively coupled with the host via a communication port over the port 26 and receives electrical power via an electrical power port 250. The processor 210 may be a microprocessor although any suitable processor may be employed. For example, the processor 210 may be comprised of sub-processors, such as a multi-core processor, serial communication ports, peripheral interfaces (e.g., serial peripheral interface), on-chip memory, I/O ports, and/or the like. In these and other embodiments, the processor 210 is configured to perform operations on received and processed signals, such as digitized signals.

The processor 210 may receive digitized sensor signals from the one or more signal processors 220. The processor 210 is also configured to provide information, such as a phase difference, a property of a fluid in the sensor assembly 10, or the like. The processor 210 may provide the information to the host through the communication port. The processor 210 may also be configured to communicate with the one or more memories 230 to receive and/or store information in the one or more memories 230. For example, the processor 210 may receive calibration factors and/or sensor assembly zeros (e.g., phase difference when there is zero flow) from the one or more memories 230. Each of the calibration factors and/or sensor assembly zeros may respectively be associated with the vibratory meter 5 and/or the sensor assembly 10. The processor 210 may use the calibration factors to process digitized sensor signals received from the one or more signal processors 220.

The one or more signal processors 220 is shown as being comprised of an encoder/decoder (CODEC) 222 and an analog-to-digital converter (ADC) 226. The one or more signal processors 220 may condition analog signals, digitize the conditioned analog signals, and/or provide the digitized signals. The CODEC 222 is configured to receive the sensor signals 165 from the left and right pick-off sensors 170l, 170r. The CODEC 222 is also configured to provide the drive signal 185 to the driver 180. In alternative embodiments, more or fewer signal processors may be employed.

As shown, the sensor signals 165 are provided to the CODEC 222 via a signal conditioner 240. The drive signal 185 is provided to the driver 180 via the signal conditioner 240. Although the signal conditioner 240 is shown as a single block, the signal conditioner 240 may be comprised of signal conditioning components, such as two or more op-amps, filters, such as low pass filters, voltage-to-current amplifiers, or the like. For example, the sensor signals 165 may be amplified by a first amplifier and the drive signal 185 may be amplified by the voltage-to-current amplifier. The amplification can ensure that the magnitude of the sensor signals 165 is approximate the full-scale range of the CODEC 222.

In the embodiment shown, the one or more memories 230 is comprised of a read-only memory (ROM) 232, random access memory (RAM) 234, and a ferroelectric random-access memory (FRAM) 236. However, in alternative embodiments, the one or more memories 230 may be comprised of more or fewer memories. Additionally, or alternatively, the one or more memories 230 may be comprised of different types of memory (e.g., volatile, non-volatile, etc.). For example, a different type of non-volatile memory, such as, for example, erasable programmable read only memory (EPROM), or the like, may be employed instead of the FRAM 236. The one or more memories 230 may be a storage configured to store process data, such as drive or sensor signals, mass flow rate or density measurements, etc.

A mass flow rate measurement (m) can be generated according to the equation:

$$\dot{m} = FCF[\Delta t - \Delta t_0] \qquad [1]$$

The $\Delta t$ term comprises an operationally-derived (i.e., measured) time delay value comprising the time delay existing between the pickoff sensor signals, such as where the time delay is due to Coriolis effects related to mass flow rate through the vibratory meter 5. The measured $\Delta t$ term ultimately determines the mass flow rate of the flow material as it flows through the vibratory meter 5. The $\Delta t_0$ term comprises a time delay/phase difference at zero flow calibration constant. The $\Delta t_0$ term is typically determined at the factory and programmed into the vibratory meter 5. The time delay/phase difference at zero flow $\Delta t_0$ term will not change, even where flow conditions are changing. A mass flow rate of flow material flowing through the flow meter is determined by multiplying a measured time delay (or phase difference/frequency) by the flow calibration factor FCF. The flow calibration factor FCF is proportional to a physical stiffness of the flow meter.

As to density, a resonance frequency at which each conduit 130, 130' will vibrate may be a function of the square root of a spring constant of the conduit 130, 130' divided by the total mass of the conduit 130, 130' having a material. The total mass of the conduit 130, 130' having the material may be a mass of the conduit 130, 130' plus a mass of a material inside the conduit 130, 130'. The mass of the material in the conduit 130, 130' is directly proportional to the density of the material. Therefore, the density of this material may be proportional to the square of a period at which the conduit 130, 130' containing the material oscillates multiplied by the spring constant of the conduit 130, 130'. Hence, by determining the period at which the conduit 130, 130' oscillates and by appropriately scaling the result, an accurate measure of the density of the material contained by the conduit 130, 130' can be obtained. The meter electronics 20 can determine the period or resonance frequency using the sensor signals 165 and/or the drive signal 185.

As discussed above, a fluid property value, such as a density value, mass flow rate value, or the like, of a multi-phase fluid flow may not be an accurate measurement of a fluid property of the multi-phase flow. For example, a density value of a liquid phase of the multi-phase fluid flow may not be an accurate measurement of a density of the liquid phase because the density value is based on a measurement of both the liquid phase and a gas phase of the multi-phase fluid flow. Accordingly, the fluid flow property value of a multi-phase fluid flow may be corrected by a measurement correction method.

However, the measurement correction method may need to be well-suited for the multi-phase fluid flow. Two or more measurement correction methods may be available, each of which is well suited for a particular type of multiphase fluid flow. For example, the multiphase fluid flow may be comprised of a single-phase liquid fluid flow interposed with mixed liquid-gas phase flows. Accordingly, a measurement correction method that accurately measures the single-phase liquid fluid flow and then corrects a fluid property value of the mixed liquid-gas phase fluid flows may be well suited. That is, the fluid property value of the mixed liquid-gas phase fluid flow may be desirably accurate (e.g., within a specified tolerance). As is explained in more detail in the following after some exemplary measurement correction methods are discussed, a measurement correction method may be selected from two or more measurement correction methods.

Exemplary Measurement Correction Methods

The following discusses various exemplary measurement correction methods, although any suitable measurement correction method may be employed. The measurement correction methods may compensate for multiphase effects of a material in the sensor assembly. The measurement correction methods may be used to correct fluid property values of a multiphase fluid flow, such as a mixed liquid-gas fluid flow, although the measurement correction methods may be suitable for other multiphase fluid flows, such as multi-component liquid fluid flow comprised of different liquids having different densities.

One measurement correction method may be a liquid phase measurement method that is suited for multi-phase flows that include intermittent periods of single-phase liquid phase flows. The intermittent periods of single-phase liquid flows are interposed by liquid and gas mixture flows. Because of the intermittent periods of single-phase liquid flows, a peak or maximal density value is assumed to be an accurate liquid density measurement. More specifically, during a period of density measurement, the peak or maximal density value is assumed to be a liquid density value. The liquid density value may be used to, for example, correct a mass flow rate value, a liquid volume value, or the like. The liquid density value may also be used to estimate a gas-volume fraction (GVF) of the multiphase flow.

Another measurement correction method may be a gas phase measurement method that is suited for multiphase flows with intermittent periods of single-phase gas flows. The intermittent single-phase gas flows are interposed by mixed-phase fluid flows. Because of the intermittent periods of single-phase gas flow, a gas mass flow rate may be determined. More specifically, during a period of mass flow rate measurement that includes both single and multi-phase flows, the minimal or least maximal density value is assumed to be a gas density value. The gas density value may be used to determine that a contemporaneous mass flow rate value is a gas mass flow rate value. The gas mass flow rate value may be used to, for example, correct a gas mass flow rate value, estimate a total liquid mass flow by subtracting the total gas mass flow from the total mass flow, or the like. A liquid mass flow rate may be estimated by dividing the total liquid mass flow by a total measurement time period.

The above liquid and gas phase measurement methods may rely on intermittent periods of single-phase flows. For example, as discussed above, the liquid phase measurement method depends on intermittent single-phase liquid phase flows to determine an accurate liquid density value. However, such single-phase flows may not be present, with sufficient frequency and/or quiescence, to ensure that the liquid density value is accurate. More specifically, the liquid phase measurement method may only hold the liquid density value for a period of time because the liquid density value may not be accurate after the period of time. Other methods may be more suitable, such as those described below.

One exemplary method is a process parameter correlation method. In the process parameter correlation method, a process parameter may be correlated with a fluid flow property. The process parameter may be any suitable process parameter, such as a density, drive gain, temperature, pressure, pickoff amplitude, tube stiffness and damping, etc. Similarly, the fluid flow property may be any suitable fluid flow property, such as a density, mass flow rate, etc., of the fluid flow. The correlation can be a table relating one or more process parameters and fluid flow properties. For example, density values may be correlated with phase fraction values. These phase fraction values may be used with a mass flow rate value of the fluid flow to determine other fluid properties, such as a liquid mass flow rate value, a density mass flow rate value, etc. Similarly, drive gain values may be correlated with the phase fraction values.

Another exemplary method is a high frequency slugging analysis method. Slug flow occurs when single phase gas fluid flows are interposed with single phase liquid fluid flows. These single phase flows may be referred to as slugs. In the high frequency slugging analysis method, sensor signals may be sampled at relatively high sampling rates where characteristics of the sensor signals and/or measurements may be quantified. At the high sampling rates, the sensor signals and/or measurements may have characteristics that are correlated with properties of the slugs. For example, the slugs may cause an unequal distribution of liquid from an inlet to an outlet of a sensor assembly as the slugs move through the sensor assembly. This unequal distribution of the fluid can cause the characteristics as the slug moves from the inlet to the outlet.

The slug's magnitude, length, duration, and frequency may be determinable from the characteristics of the sensor signals and/or measurements. The magnitude is how much of a conduit is filled (e.g., does it extend entirely to the inner surface of the conduit). The length is how much of the conduit length does the slug occupy. The duration is how long does the slug persist in the conduit. The frequency is how often the pattern is repeated. The combination of these aspects of the slug can be determined by the characteristics in the sensor signals and/or measurements (e.g., mass flow, density, drive gain, etc.). The combination of the aspects of the slug are related to the gas velocity and liquid velocity, which allows for solving slip. Slip is where the gas flows faster than the liquid. By quantifying slip, and knowing the aspects of the slug, the fluid properties, such as a mass flow rate, density, or the like, of a fluid may be determinable.

As can be appreciated, the above exemplary measurement correction methods may not be comprehensive. That is, other measurement correction methods may be used, additional or alternative to the above methods. Accordingly, one of the foregoing and/or other measurement correction methods may be selected, as the following discussion illustrates.

Exemplary Selections

Selecting a measurement correction method from two or more measurement correction methods may be based on one or more process parameter values. For example, a density may be used to determine if the multiphase fluid flow is predominately liquid or predominately gas. Accordingly, the selected measurement correction method may be suited for the predominate phase of the multiphase fluid flow.

Accordingly, detecting a single-phase flow may be a condition precedent to selecting a measurement correction method. For example, if a single-phase flow has not yet occurred, then the gas and liquid phase measurement methods may not be suitable. If a single-phase flow is detected, then the gas and liquid phase measurement methods may be suitable. A suitable measurement correction method may be a measurement correction method that can provide an accurate measurement of a fluid property of the fluid flow.

A condition precedent to selecting the measurement correction method can also be a time since a most recent detection of a single-phase flow (referred to as a "non-single-phase flow elapsed time" or "hold value age"). For example, if a single-phase flow occurred and the hold value age is less than a fluid property value hold time, then the gas or liquid phase measurement method may be suitable. Alternatively, if the hold value age is greater than the fluid property hold time, then the gas or liquid phase measurement methods may not be suitable.

The single-phase flow may be detected by a drive gain value that is less than a single-phase drive gain threshold. Accordingly, the time since the most recent detection of the single-phase flow may be defined as an elapsed time since drive gain value exceeded the single-phase drive gain threshold and remained substantially continuously greater than the single-phase drive gain threshold value. That is, the non-single-phase elapsed time may be when the drive gain is greater than the single-phase drive gain threshold. However, a measurement period of the multiphase fluid flow may begin with a mixed liquid-gas fluid flow.

Accordingly, a condition precedent to selecting the measurement correction method may also be a non-detection of a single-phase flow. For example, a condition precedent may be that a single-phase fluid flow has not been detected and until the single-phase fluid flow is detected, then a single-phase dependent method, such as the gas or liquid phase measurement methods discussed above, will not be selected. Instead, another method that may not depend on an accurate liquid density value or gas mass flow rate value may be selected until the single-phase flow is detected. The correction methods that do not depend on an accurate single-phase fluid property value may be referred to as a single-phase independent correction method.

As discussed above, the fluid property value may be used as a hold value by the gas or liquid phase measurement method during the hold value time. The hold value time may be predetermined, based on process conditions, etc. The hold value time may reflect an estimated time that the hold value is accurate. Accordingly, for any measurement correction performed after the hold value time, a single-phase independent correction method may be employed. For example, the process parameter correlation method described above may be employed if the non-single-phase elapsed time is greater than the hold value time.

Determining a hold value type may also be a condition precedent. The hold value type may be the identification of the singe-phase fluid flow. For example, the hold value type may be "gas" or "liquid", although any suitable label may be employed. The hold value type may indicate that the single-phase fluid flow was identified as a gas or liquid. This value may be used to determine if the gas phase measurement method or the liquid phase measurement method is used as the measurement correction method. For example, because a single-phase fluid flow was identified as a liquid phase fluid flow, the fluid flow may be assumed to be a predominately liquid phase fluid flow because a predominately gas phase fluid flow is not likely to have a liquid phase fluid flow.

One or more process parameter values may be used to detect a single-phase fluid flow, and/or identify the single-phase fluid flow as a gas or liquid fluid flow. For example, a drive gain may be used to detect a single-phase fluid flow. More particularly, if the drive gain value is less than a single-phase drive gain threshold for a detection period, then the fluid flow may be a single-phase fluid flow because a mixed-phase flow may have an oscillating drive gain due to varying density of the fluid flow. Additionally, or alternatively, a density value may be employed to detect and/or identify the single-phase fluid flow as a liquid or gas fluid flow. In one example, a gas fluid flow may be identified when a drive gain value is less than the single-phase drive gain threshold and the density value is less than a gas density value threshold.

Regardless of whether a single-phase fluid flow is detected and/or identified, the above methods, or other methods, may be selected based on one or more process parameter values. For example, if a drive gain value is greater than a selection threshold and a non-single flow elapsed time is greater than a fluid property value hold time, then a single-phase independent method may be employed. In another example, if the drive gain value is greater than the selection threshold and the non-single flow elapsed time is less than the fluid property value hold time, and the hold value type is equal to "gas," then the gas phase measurement method may be employed.

Exemplary Algorithm

As explained above, a single-phase fluid flow may be detected and/or identified as a condition precedent to selecting a measurement correction method. A drive gain value may be compared to a single-phase drive gain threshold to detect a single-phase fluid flow. The single-phase fluid flow may be identified by additionally comparing a density value of the detected single-phase fluid flow with a liquid phase drive gain threshold and/or a gas phase drive gain threshold. As can be appreciated, as long as the single-phase fluid flow remains detected by, for example, the drive gain being less than the single-phase drive gain threshold, then a fluid property value may not need to be corrected. An algorithm can repeatedly detect the single-phase fluid flow until a mixed phase fluid flow occurs.

While the single-phase fluid flow is detected, the algorithm may also store a fluid property value as a hold value. For example, a density value of a single-phase fluid flow identified as a liquid phase fluid flow may be stored. The algorithm may also store the identified fluid flow as a hold value type. For example, for the case of the single-phase fluid flow being identified as a liquid phase fluid flow, the hold value type may be "liquid," or something indicating that the single-phase fluid flow is a liquid phase fluid flow. The algorithm may also store a hold value time, which may indicate how long the hold value may be an accurate measurement of the fluid property.

If a mixed phase fluid flow occurs, then the drive gain value may not be less than the single-phase drive gain threshold. Accordingly, the algorithm may detect the mixed phase fluid flow if the drive gain value is greater than the single-phase drive gain threshold. If the drive gain value is greater than the single-phase drive gain threshold, then the algorithm may select a measurement correction method and correct a fluid property value that is determined contemporaneous to the detection of the mixed phase fluid flow. For example, the algorithm may determine fluid property value based on the sensor signals and use the selected one of the two or more measurement methods to correct the fluid property value.

The measurement correction method to be used may be selected based on a comparison of the one or more process parameter values to corresponding reference values. The one or more process parameter values may include, for example, a drive gain value, a hold type, characteristics of signals and measurements, and/or non-single fluid flow elapsed time, although any suitable process parameter values may be employed. The comparison may be a numerical relationship (e.g., greater than, less than, or equal to), choice comparison (e.g., is the hold type "liquid" or "gas"), a Boolean comparison (e.g., is the pulsation detected or not), etc. Various combinations of the above comparisons may be employed in the algorithm. An exemplary algorithm is shown in the following.

---

```
If (drive gain < single-phase drive gain threshold)
    If (density value > liquid density threshold)
        {set hold value type as "liquid"}
        {save a density value as a liquid density value}
    Else (density value < gas density threshold)
        {set hold value type as "gas"}
        {save mass flow rate value as a gas mass flow rate value}
    Else (drive gain > non-single-phase drive gain threshold)
        AND (hold value type = gas)
        AND (hold value age < hold value age limit)
        AND (pulsation = false)
            {use a gas phase measurement method}
    Else (drive gain > non-single-phase drive gain threshold)
        AND (hold value type = liquid)
        AND (hold value age < hold value age limit)
        AND (pulsation = false)
            {use a liquid phase measurement method}
```

-continued

```
Else (drive gain > non-single-phase drive gain threshold)
    AND (hold value age > hold value age limit)
    AND (pulsation = false)
        {use drive gain and density correlation method}
Else (drive gain > single-phase drive gain threshold)
    AND (hold value age > hold value age limit)
    AND (pulsation = true)
        {use high frequency slugging analysis}
```

---

As can be seen, the exemplary algorithm detects if a fluid flow is a single-phase fluid flow by comparing a drive gain to a single-phase drive gain threshold and identifies the detected single-phase fluid flow as a gas or liquid fluid flow based on a comparison between a density value and a liquid density threshold and a gas density threshold. After the single-phase fluid flow is detected and identified, the algorithm stores a fluid property value as a hold value and the identified fluid flow as a hold value type. The algorithm may perform these steps repeatedly until the drive gain value is greater than the single-phase drive gain threshold.

If the drive gain value is greater than the single-phase drive gain threshold, then the additional process parameter values are compared to reference values. For example, if the hold value type is "gas", the hold value age is less than a hold value age limit, and the pulsation is "false", then the gas phase measurement method may be selected. In another example, if the hold value age is greater than the hold value age limit and the pulsation is true, then a high frequency slugging analysis may be selected.

Graphs Showing a Selection of a Measurement Correction Method

Figure 3:
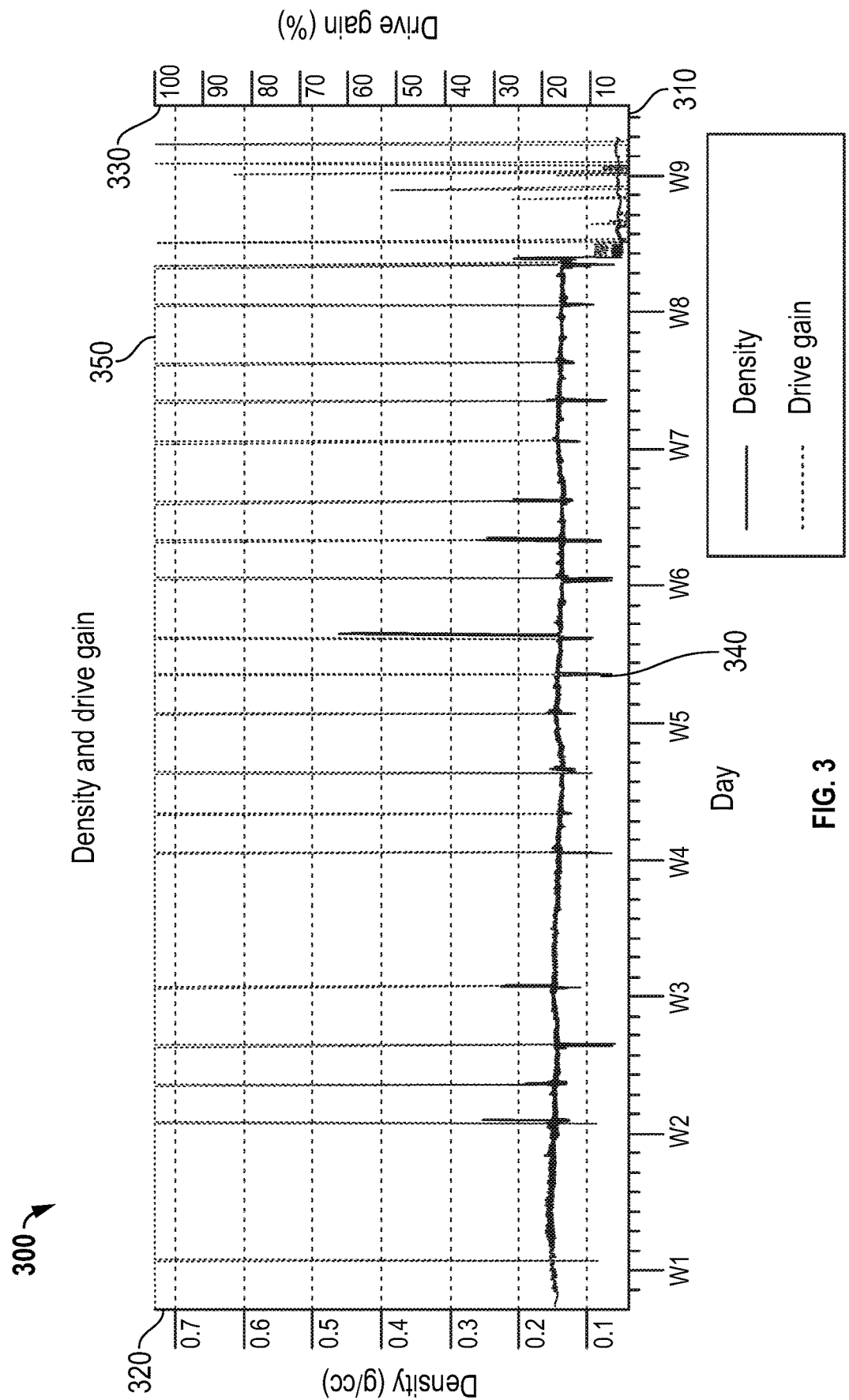
FIGS. 3 and 4 show graphs 300, 400 depicting a selection of a measurement correction method.
Figure 4:
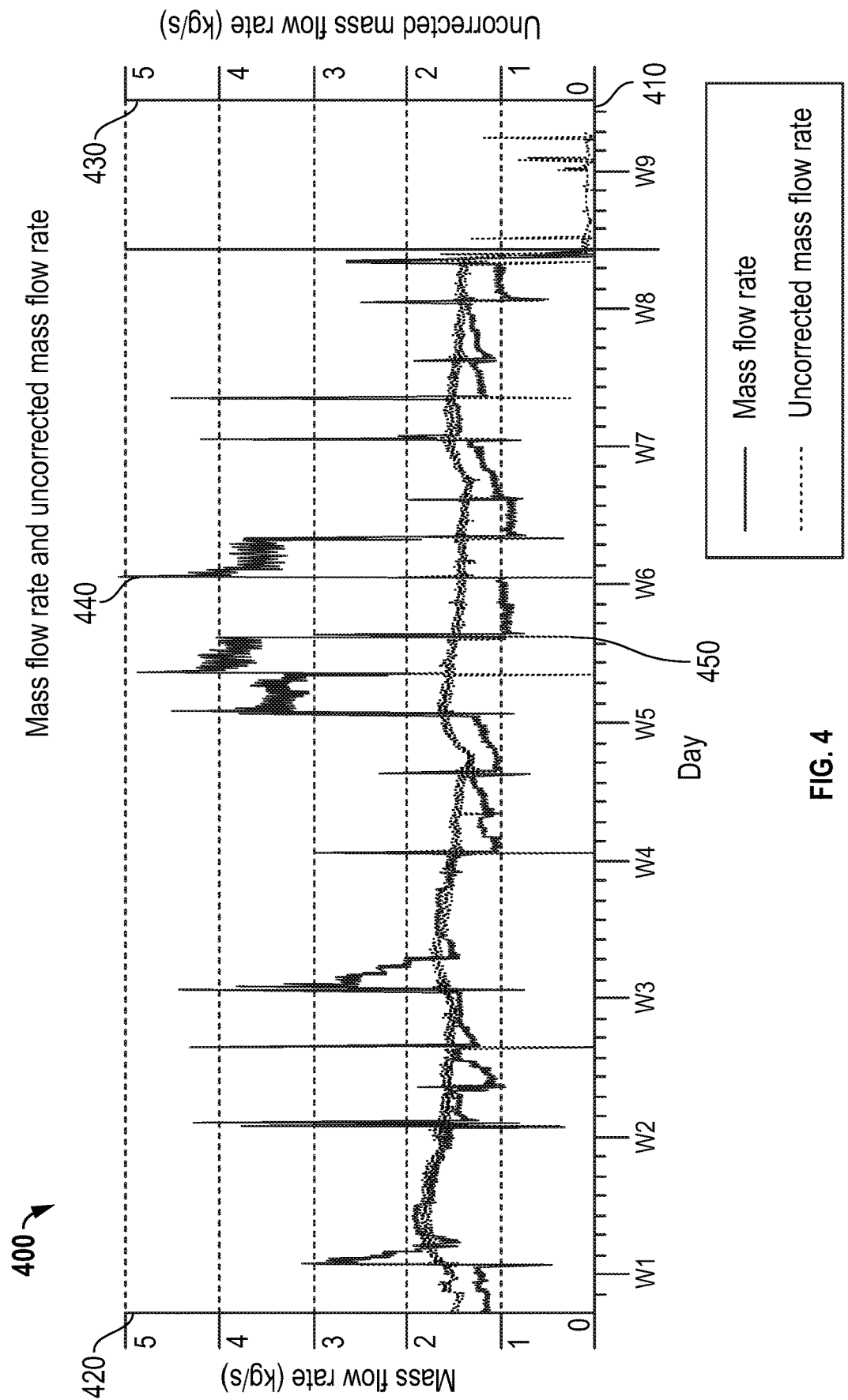

FIGS. 3 and 4 show graphs 300, 400 depicting process parameter values while measurement correction methods are employed. As shown in FIG. 3, the graph 300 includes a day axis 310, a density axis 320, and a drive gain axis 330. The day axis 310 is in units of days where each week is denoted by a "W" followed by a number beginning with "1". Each tic mark denotes a day. The density axis 320 is in units of grams-per-cubic centimeter (g/cc) and the drive gain axis 330 is unit-less. The graph 300 also includes a density plot 340 and a drive gain plot 350. As shown in FIG. 4, the graph 400 includes a day axis 410, a mass flow rate axis 420, and a uncorrected mass flow rate axis 430. The day axis 410 is in units of days where each week is denoted by a "W" followed by a number beginning with "1". Each tic mark denotes a day. The mass flow rate axis 420 and the uncorrected mass flow rate axis 430 are in units of kilograms-per-second (kg/sec). The graph 400 also includes a mass flow rate plot 440 and a uncorrected mass flow rate plot 450. The mass flow rate plot 440 represents a corrected mass flow rate and the uncorrected mass flow rate plot 450 represents an uncorrected mass flow rate.

Referring to FIG. 3, the drive gain plot 350 is typically about 100% from W1 a few days after W8. The drive gain plot 350 may indicate that from W1 to shortly after W8, the fluid flow is predominately a mixed phase fluid flow. That is, the fluid flow is a mixture of a gas and a liquid. As can also be seen, prior to W1, the drive gain plot 350 was not less than 10%. As a result, according to the above algorithm, a hold value type is not stored. Accordingly, either the drive gain and density correlation method or the high frequency slugging analysis may be employed. A density value is also not stored as a hold value.

The density plot 340 is about 0.15 g/cc over an entire range of days, until between W8 and W9 with intermittent spikes in positive and negative going directions. For example, shortly after W2, the density plot 340 has a spike that increases to about 0.25 g/cc. This spike corresponds to a negative going spike in the drive gain plot 350. More specifically, the drive gain plot 350 decreases from about 100% to about 8%. This value may be less than a single-phase drive gain threshold that is about, for example, 10%. Accordingly, the density values of the spike in the density plot 340 may be representative of a single-phase fluid flow or, more particularly, a single-phase liquid fluid flow.

At about day 2.5 of W8, the drive gain plot 350 decreases from about 100% to less than 10%. Subsequently, there are positive going spikes up to 100%, but the drive gain plot 350 is otherwise typically less than 10%. In addition, the density plot 340 decreases to about 0.3 g/cc. Also, the density plot 340 being about 0.3 g/cc may be less than a gas density threshold, such as 0.5 g/cc. The fluid flow may therefore be predominately single-phase gas flow with intermittent mixed-phase fluid flow that are contemporaneous to the positive-going spikes in the density plot 340. As a result, according to the algorithm above, mass flow rate values of the mass flow rate plot 440 may be stored as a hold value, a value of "gas" may be stored as the hold value type, and the hold value age may be from about day 2.5 of W8. The algorithm above may also select the gas phase measurement method as a measurement correction method.

In FIG. 4, a gas measurement correction method may be used to determine the mass flow rate plot 440. Between W1 and W8, the fluid flow is predominately a wet gas fluid flow with several periods of single-phase liquid fluid flows at W3, W5, and W6. During the single-phase liquid fluid flows, the mass flow rate plot 440 is greater than the uncorrected mass flow rate plot 450. This may be due to the uncorrected mass flow rate plot 450 being corrected with void fraction ratio that was incorrect. If the process parameter correlation method is employed, then a corrected mass flow rate value would be more accurate.

Meter Electronics for Selecting a Measurement Correction Method

Figure 5:
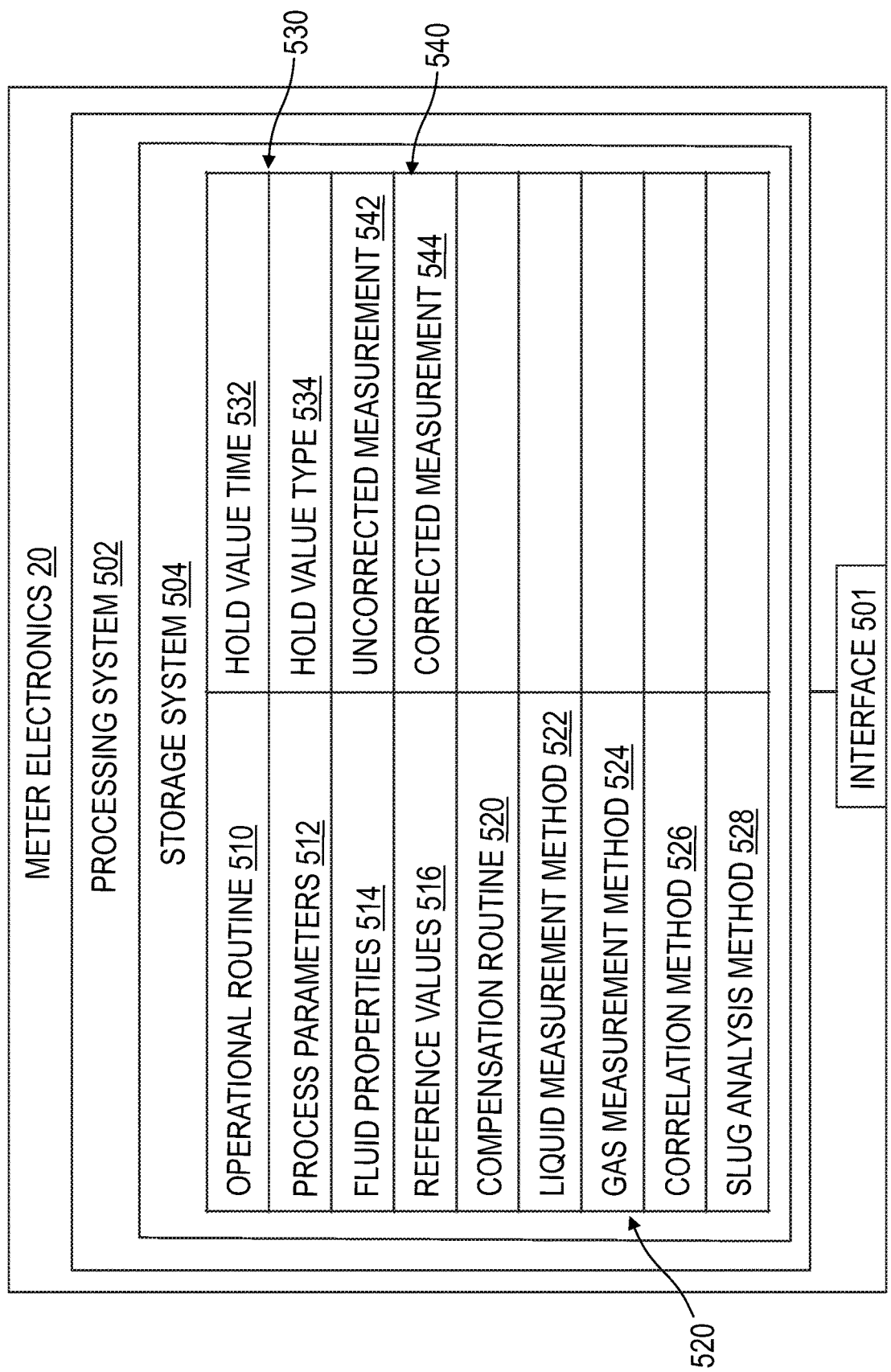
FIG. 5 shows the meter electronics 20 for selecting a measurement correction method.

FIG. 5 shows the meter electronics 20 for selecting a measurement correction method. As shown in FIG. 5, the meter electronics 20 includes an interface 501 and a processing system 502. The meter electronics 20 receives a vibrational response, such as from the sensor assembly 10, for example. The meter electronics 20 processes the vibrational response in order to obtain flow characteristics of the flow material flowing through the sensor assembly 10.

The interface 501 may receive the sensor signals 165 from one of the pick-off sensors 170l, 170r shown in FIGS. 1 and 2. The interface 501 can perform any necessary or desired signal conditioning, such as any manner of formatting, amplification, buffering, etc. Alternatively, some or all of the signal conditioning can be performed in the processing system 502. In addition, the interface 501 can enable communications between the meter electronics 20 and external devices. The interface 501 can be capable of any manner of electronic, optical, or wireless communication. The interface 501 can provide information based on the vibrational response. The interface 501 may be coupled with a digitizer, such as the CODEC 222 shown in FIG. 2, wherein the sensor signal comprises an analog sensor signal. The digitizer samples and digitizes an analog sensor signal and produces a digitized sensor signal.

The processing system 502 conducts operations of the meter electronics 20 and processes flow measurements from the sensor assembly 10. The processing system 502 executes one or more processing routines and thereby processes the flow measurements in order to produce one or more flow characteristics. The processing system 502 is communicatively coupled to the interface 501 and is configured to receive the information from the interface 501.

The processing system 502 can comprise a general-purpose computer, a micro-processing system, a logic circuit, or some other general purpose or customized processing device. Additionally, or alternatively, the processing system 502 can be distributed among multiple processing devices. The processing system 502 can also include any manner of integral or independent electronic storage medium, such as the storage system 504.

The storage system 504 can store flow meter parameters and data, software routines, constant values, and variable values. In one embodiment, the storage system 504 includes routines that are executed by the processing system 502, such as an operational routine 510 and a compensation routine 520 of the vibratory meter 5. The storage system can also store statistical values, such as a standard deviation, confidence intervals, or the like.

The operational routine 510 may determine one or more process parameters 512 values and fluid properties 514 values based on the sensor signals received by the interface 501. The process parameters 512 may be comprised of any values that characterizes a process involving a fluid flow. For example, the process parameters 512 may include drive gain, resonance frequency, vibration amplitude, density, mass flow rate, calibration, etc., values. The fluid properties 514 may be comprised of values that are measurements of properties of the fluid flow. For example, the fluid properties 514 may be comprised of density, mass flow rate, volume flow rate, etc. values.

The process parameters 512 may be compared to reference values 516 to determine which measurement correction method is to be selected, as well as to detect and determine a type of a single-phase fluid flow. For example, the reference values 516 may be comprised of a single-phase drive gain threshold which can be used to detect a single-phase fluid flow if a drive gain value is less than the single-phase drive gain threshold. The reference values 516 may also include a value type reference, such as "gas" or "liquid." The reference value 516 may also include a hold value age limit.

The reference values 516 may be any suitable value type, such as Boolean, numerical, lists, etc. Accordingly, the compensation routine 520 may determine if the one or more process parameter values are less than, greater than, or equal to the corresponding reference values. As discussed above, the measurement correction method may be selected based on a combination of at least two of the comparisons. For example, according to the algorithm above, a gas measurement method is selected based on a combination of a drive gain being greater than a non-single-flow drive gain threshold, a hold value type of "gas", a hold value age that is less than a hold value age limit, and a pulsation being false.

The compensation routine 520 may correct a fluid property value, such as a mass flow rate value or density value. For example, as will be described in more detail in the following, the compensation routine 520 may store two or more measurement correction methods and select one of the two or more measurement correction methods based on one or more of the process parameters 512. Accordingly, the processing system 502 may be configured to store two or more measurement correction methods.

As shown in FIG. 5, the processing system 502 stores a liquid measurement method 522, a gas measurement method 524, a correlation method 526, and a slug analysis method 528. The liquid measurement method 522 and gas measurement method 524 may respectively be the same as or similar to the liquid measurement method and the gas measurement method described above. The correlation method 526 and the slug analysis method 528 may respectively be the same as or similar to the process parameter correlation method and the high frequency slug analysis method described above.

The compensation routine 520 may select one of the two or more measurement correction methods based on the one or more process parameter values in various ways. For example, the compensation routine 520 may select the one of the two or more measurement correction methods based on a comparison of the one or more process parameter values to corresponding reference values, such as the reference values 516 described above. The compensation routine 520 also determines any condition precedents to selecting the measurement correction method.

For example, the compensation routine 520 may detect and identify a single-phase fluid flow based on the one or more process parameter values, determine a fluid property of the single-phase fluid flow, and select the one of the two or more measurement correction methods based on the fluid property. Accordingly, the compensation routine 520 may store the identified single-phase fluid flow as a hold value type. For example, if the compensation routine 520 detects and identifies a single-phase liquid fluid flow, then the compensation routine 520 may store "liquid" as the hold value type. The compensation routine 520 may also store a density value as a liquid density value. That is, the density value may be assumed to be an accurate measurement of a liquid fluid flow.

The compensation routine 520 may also correct a fluid property value, such as an uncorrected measurement 542 into a corrected measurement 544. The uncorrected measurement 542 and the corrected measurement 544 may be values of a parameter of a material that is measured by the vibratory meter 5. The parameter may be any suitable parameter, such as density, mass flow rate, or any derived values, such as percentage void fraction, mixture or mixture component densities, etc. The uncorrected measurement 542 may be, for example, mass flow rate values similar to those of the uncorrected mass flow rate plot 450 described above. The corrected measurement may be values of, for example, the mass flow rate values similar to those of the mass flow rate plot 440.

The compensation routine 520 may also perform two or more of the correction methods simultaneously and selecting a value output by one of the measurement correction methods. For example, the compensation routine 520 may simultaneously execute the liquid measurement method 522, the gas measurement method 524, the correlation method 526, and/or the slug analysis method 528 and output the value provided by the selected method. For example, with reference to FIG. 4 described above, the gas measurement method 524 may be executed simultaneous with the correlation method 526, but the values determined by the correlation method 526 may be provided prior to day 2.5 of W8 and the values determined by the gas measurement method 524 may be provided after day 2.5 of W8. Provided may mean providing the fluid property values via the interface 501 or port 26, although any suitable means may be employed.

Also shown in FIG. 5 is hold value data 530, which may include hold value time 532 and hold value type 534. As discussed above, the hold value time 532 may set a time-period in which a fluid property value may be used as a hold value by the gas or liquid phase measurement method. The hold value time 532 may reflect an estimated time that the hold value is accurate. The hold value type 534 may be the identification of the singe-phase fluid flow. For example, the hold value type 534 may be "gas" or "liquid", although any suitable label may be employed. The hold value type 534 may indicate that the single-phase fluid flow was identified as a gas or liquid.

The processing system 502 may therefore provide a corrected measurement. As shown in FIG. 5, the processing system 502 includes measurements 540, which include an uncorrected measurement 542 and a corrected measurement 544. The measurements 540 may be comprised of fluid property values. The processing system 502 may determine and store an uncorrected measurement 542 value when the uncorrected measurement 542 is determined. A suitable measurement correction method may be selected by the processing system 502 to determine the corrected measurement 544. The processing system 502 may accordingly execute a method for selecting a measurement correction method, such as the exemplary method discussed in the following.

Method for Selecting a Measurement Correction Method

Figure 6:
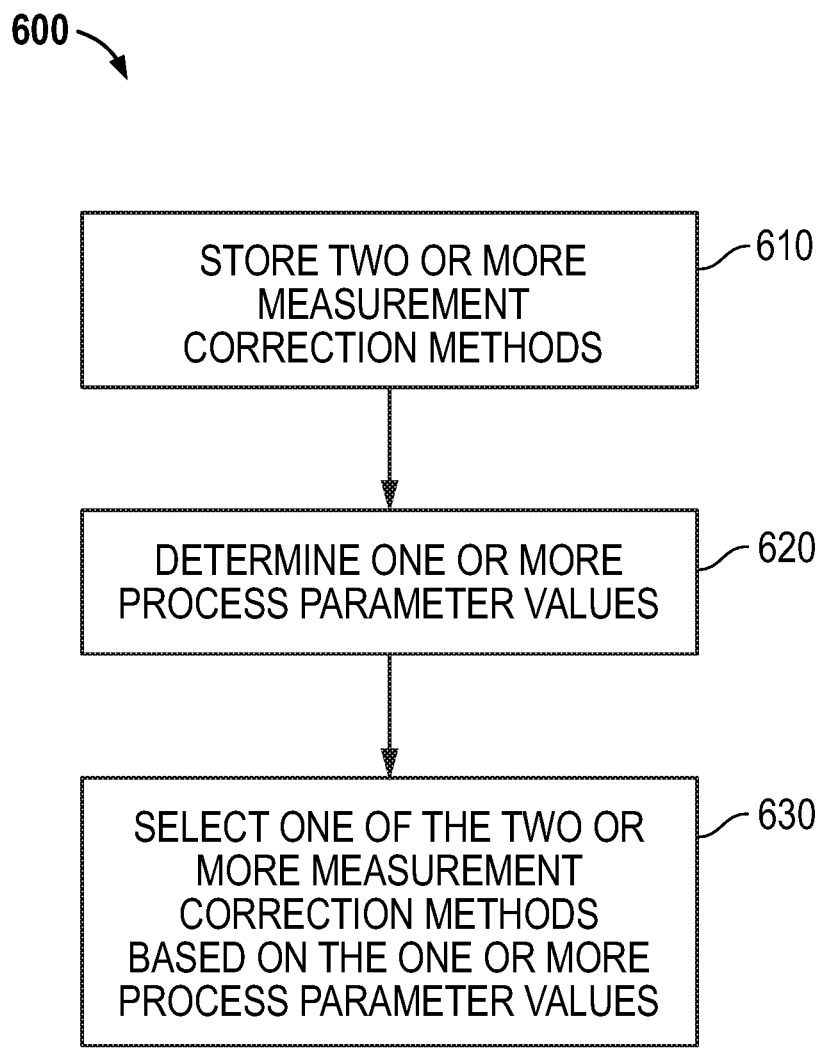
FIG. 6 shows a method 600 for selecting a measurement correction method.

FIG. 6 shows a method 600 for selecting a measurement correction method. As shown in FIG. 6, the method 600 begins by storing two or more measurement correction methods in step 610. The method 600 may performed by the vibratory meter 5 and meter electronics 20 described above, although any suitable vibratory meter and/or meter electronics may be employed. In step 620, the method 600 determines one or more process parameter values. The method 600, in step 630, selects one of the two or more measurement correction methods based on the one or more process parameter values.

The method 600 may store the one or more measurement correction methods in, for example, the processing system 502 described above, although any suitable storage may be employed. The process parameter values may include a drive gain, a density value, a pulse present value, etc., although any suitable value may be employed.

In step 630, the method 600 may select the one of the two or more measurement correction methods based on a comparison of the one or more process parameter values to corresponding reference values. For example, the method 600 may determine if the one or more process parameter values are less than, greater than, or equal to the corresponding reference values. The method 600 may also select the one of the two or more measurement correction methods based on a combination of at least two of the comparisons.

Prior to selecting the one of the two or more measurement correction methods, the method 600 may perform some condition precedents. For example, the method 600 may detect and identify a single-phase fluid flow based on the one or more process parameter values and determine a hold value type of the single-phase fluid flow based on the identification of the single-phase fluid flow. Accordingly, the method 600 may also compare a hold value age to a hold value time of the fluid property and select the one of the two or more measurement correction methods based on the comparison.

The vibratory meter 5, meter electronics 20, and method 600 described above may select the measurement correction method based on one or more process parameters. As a result, the selected measurement correction method may be more suited for the fluid flow. That is, fluid property values provided by the vibratory meter 5, meter electronics 20, and method 600 may be more accurate. For example, a mass flow rate value provided by the meter electronics 20 may be an accurate mass flow rate measurement of a multiphase fluid flow even though the multiphase fluid flow began with a period of single-phase liquid fluid flow because the liquid measurement method was selected, rather than the gas measurement method.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other meter electronics, vibratory meters, and methods for selecting a measurement correction method and not just to the embodiments described above and shown in the accompanying figures. Accordingly, the scope of the embodiments described above should be determined from the following claims.

I claim:

1. A meter electronics (20) for selecting a measurement correction method, the meter electronics (20) comprising:
   an interface (501) configured to communicatively couple to a sensor assembly (10) and receive sensor signals from the sensor assembly (10); and
   a processing system (502) communicatively coupled to the interface (501), the processing system (502) being configured to:
   store two or more measurement correction methods, wherein the two or more measurement correction methods compensate for multiphase effects of a multiphase fluid in the sensor assembly;
   determine one or more process parameter values; and
   select one of the two or more measurement correction methods based on a hold value age of the one or more process parameter values.

2. The meter electronics (20) of claim 1, wherein the processing system (502) is further configured to:
   determine a fluid property value based on the sensor signals; and
   use the selected one of the two or more measurement correction methods to correct the fluid property value.

3. The meter electronics (20) of claim 1, wherein the processing system (502) is further configured to select the one of the two or more measurement correction methods based on a comparison of the one or more process parameter values to corresponding reference values.

4. The meter electronics (20) of claim 3, wherein the processing system (502) being configured to select the one of the two or more measurement correction methods based on a comparison of the one or more process parameter values to corresponding reference values comprises the processing system (502) being configured to select the one of the two or more measurement correction methods based on a combination of at least two of the comparisons.

5. The meter electronics (20) of claim 1, wherein the processing system (502) is further configured to:
   detect and identify a single-phase fluid flow based on the one or more process parameter values; and
   determine a hold value type of the single-phase fluid flow based on the identification of the single-phase fluid flow.

6. The meter electronics (20) of claim 1, wherein the processing system (502) being configured to select the one of the two or more measurement correction methods based on the hold value age of the one or more process parameter values comprises the processing system (502) being configured to:
   compare the hold value age to a hold value time of the one or more process parameter values; and
   select the one of the two or more measurement correction methods based on the comparison.

7. The meter electronics (20) of claim 1, wherein the processing system (502) is further configured to simultaneously perform at least two of the two or more measurement correction methods.

8. The meter electronics (20) of claim 1, wherein the one or more process parameter values is at least one of a drive gain value, a density value, a hold value type, and the hold value age.

9. A method for selecting a measurement correction method, the method comprising:
   storing two or more measurement correction methods, wherein the two or more measurement correction methods compensate for multiphase effects of a multiphase fluid in the sensor assembly;
   determining one or more process parameter values; and
   selecting one of the two or more measurement correction methods based on a hold value age of the one or more process parameter values.

10. The method of claim 9, further comprising:
    determining a fluid property value based on the sensor signals; and
    using the selected one of the two or more measurement correction methods to correct the fluid property value.

11. The method of claim 9, further comprising selecting the one of the two or more measurement correction methods based on a comparison of the one or more process parameter values to corresponding reference values.

12. The method of claim 11, wherein selecting the one of the two or more measurement correction methods based on a comparison of the one or more process parameter values to corresponding reference values comprises selecting the one of the two or more measurement correction methods based on a combination of at least two of the comparisons.

13. The method of claim 9, further comprising:
    detecting and identifying a single-phase fluid flow based on the one or more process parameter values; and
    determining a hold value type of the single-phase fluid flow based on the identification of the single-phase fluid flow.

14. The method of claim 9, wherein selecting the one of the two or more measurement correction methods based on the hold value age of the one or more process parameter values comprises:
    comparing the hold value age to a hold value time of the one or more process parameter values; and
    selecting the one of the two or more measurement correction methods based on the comparison.

15. The method of claim 9, further comprising simultaneously performing at least two of the two or more measurement correction methods.

16. The method of claim 9, wherein the one or more process parameter values is at least one of a drive gain value, a density value, a hold value type, and the hold value age.

* * * * *